(12) United States Patent
Pelini

(10) Patent No.: US 8,678,680 B1
(45) Date of Patent: Mar. 25, 2014

(54) HEADREST CAMERA MOUNTING SYSTEM

(76) Inventor: Mark Pelini, Valrico, FL (US)

( * ) Notice: Subject to any disclaimer, the term of this patent is extended or adjusted under 35 U.S.C. 154(b) by 21 days.

(21) Appl. No.: 13/547,589

(22) Filed: Jul. 12, 2012

(51) Int. Cl.
G03B 17/00 (2006.01)
F16M 11/04 (2006.01)
B60R 11/00 (2006.01)

(52) U.S. Cl.
USPC ......... 396/428; 348/148; 248/187.1; 224/275

(58) Field of Classification Search
USPC ............... 396/428–429; 348/148; 248/177.1, 248/178.1, 187.1; 224/275
See application file for complete search history.

(56) References Cited

U.S. PATENT DOCUMENTS

| | | | | |
|---|---|---|---|---|
| 6,315,180 B1 * | 11/2001 | Watkins | ...................... | 248/187.1 |
| 6,445,408 B1 * | 9/2002 | Watkins | ........................ | 348/148 |
| 6,705,578 B2 * | 3/2004 | Mulford et al. | ............ | 248/187.1 |
| 7,364,230 B2 * | 4/2008 | Zheng | ......................... | 297/188.2 |
| 7,784,864 B2 * | 8/2010 | Feder | ......................... | 297/188.06 |
| 2008/0205877 A1 * | 8/2008 | Stanev et al. | .................. | 396/428 |
| 2009/0041450 A1 * | 2/2009 | Fritts | ............................ | 396/428 |

* cited by examiner

Primary Examiner — Christopher Mahoney
(74) Attorney, Agent, or Firm — Edward P. Dutkiewicz

(57) ABSTRACT

A headrest camera mounting system, comprising, in combination a base member having a headrest end and a camera mount end and an intermediate portion there between. The base member is coupled to an upright post. There is an upright cross member having a generally rectilinear configuration being coupled to the upright post. Lastly there is a least one camera mount, with the camera mount being coupled to the upright cross member.

8 Claims, 4 Drawing Sheets

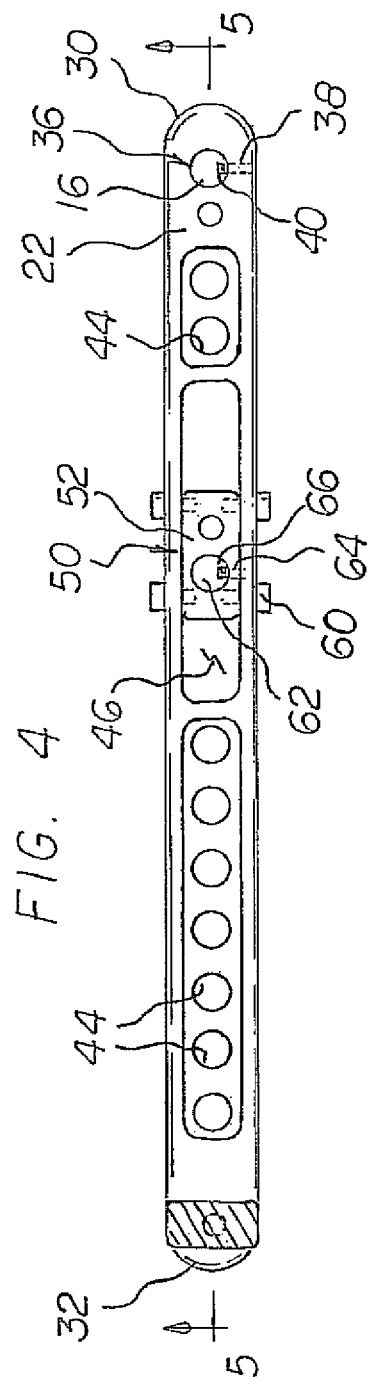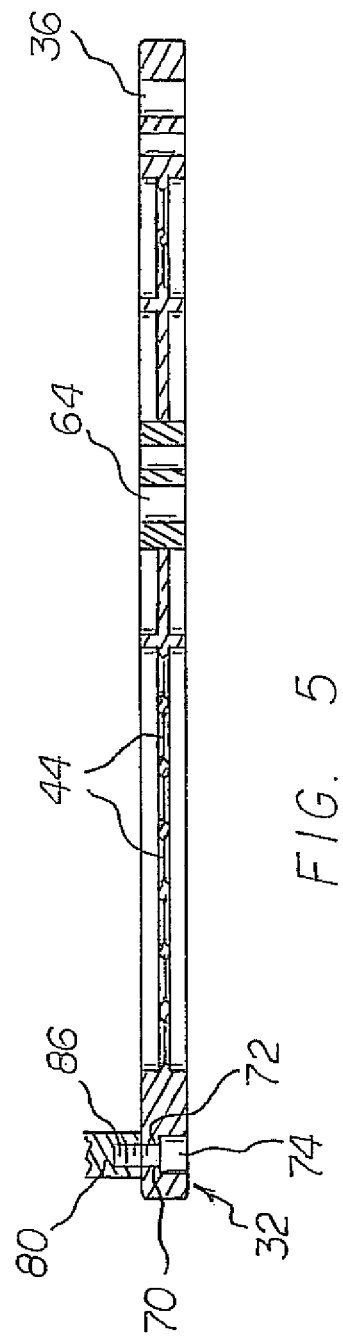

HEADREST CAMERA MOUNTING SYSTEM

BACKGROUND OF THE INVENTION

Rule 1.78(F) (1) Disclosure

The Applicant has not submitted a related pending or patented non-provisional application within two months of the filing date of this present application. The invention is made by a single inventor, so there are no other inventors to be disclosed. This application is not under assignment to any other person or entity at this time.

FIELD OF THE INVENTION

The present invention relates to a headrest camera mounting system and more particularly pertains to a device to mount a camera in a vehicle.

DESCRIPTION OF THE PRIOR ART

The use of camera mounts is known in the prior art. More specifically, camera mounts previously devised and utilized for the purpose of mounting cameras in vehicles are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the prior art does not describe a variable camera mounting system that allows a device to mount a camera from the headrest of a vehicle.

In this respect, the headrest camera mounting system according to the present invention substantially departs from the conventional concepts and designs of the prior art, and in doing so provides an apparatus primarily developed for the purpose of mounting a camera in a vehicle.

Therefore, it can be appreciated that there exists a continuing need for a new and improved headrest camera mounting system which can be used for mounting a camera in a vehicle. In this regard, the present invention substantially fulfills this need.

SUMMARY OF THE INVENTION

In view of the foregoing disadvantages inherent in the known types of camera mounts now present in the prior art, the present invention provides an improved headrest camera mounting system. As such, the general purpose of the present invention, which will be described subsequently in greater detail, is to provide a new and improved headrest camera mounting system and method which has all the advantages of the prior art and none of the disadvantages.

To attain this, the present invention essentially comprises a headrest camera mounting system, comprising several components, in combination.

First, there is an existing headrest. The headrest has a padded head portion and at least one head rest support. The headrest support has a solid tubular configuration. The headrest support couples the headrest to an existing seat. The headrest is one commonly found in automobiles, and well known in the art. Hence, no further discussion will be provided as to the configuration or usage of the headrest.

Next, there is a base member. The base member is fabricated of a rigid material, such as metal or plastic. The base member has a generally rectilinear configuration, with an upper surface, a lower surface, and a side peripheral surface there between. The base member has a headrest end and a camera mount end, with an intermediate portion there between. The headrest end has a fixed headrest support hole there through. The fixed headrest support hole runs through the base member, from the upper surface of the base member headrest end to the lower surface of the base member headrest end. The fixed headrest support hole has a first internal diameter. The first internal diameter is sized to be larger than the headrest support, and to receive the headrest support into the fixed headrest support hole. The side peripheral surface of the headrest end of the base member has a first threaded headrest support hole locking screw hole. There is a first headrest support hole locking screw associated with the support hole locking screw hole, and the screw is threadedly received therein.

The base member intermediate portion is continuous with the base member headrest end. The intermediate portion has a plurality of holes there through. The plurality of holes has the first internal diameter. The intermediate portion holes run from the upper surface of the intermediate portion to the lower surface of the intermediate portion. The intermediate portion had an upper to lower adjustment slot there through. The intermediate portion adjustment slot has a pair of peripheral side locking slots. The side locking slots are located perpendicular to the adjustment slot and communicating with the adjustment slot of the intermediate portion of the base member.

Next, there is an intermediate portion slide. The intermediate portion slide is fabricated of a rigid material. The intermediate portion slide has a generally rectilinear configuration. The intermediate portion slide has an upper surface, a lower surface, and a side edge there between. The side edge of the intermediate portion slide has a plurality of threaded slide locking holes therein, with each threaded slide locking hole having an associated slide locking bolt. The intermediate portion slide has a headrest support hole therethrough. The headrest support hole has the first internal diameter. The headrest support hole of the intermediate portion slide runs through the slide, from the upper surface of the slide to the lower surface of the slide. The side edge of the slide has a second threaded locking hole therein. The second threaded locking hole runs from the side edge of the slide into the headrest support hole of the slide. The second threaded locking hole has a second locking screw associated therewith. The slide locking bolts are configured to pass through the intermediate portion peripheral side locking slots and to be threadedly received by the threaded slide locking holes of the slide, thereby allowing for the fixation of the slide within the upper to lower adjustment slot of the intermediate portion of the base member.

The headrest end of the base member has an upright post bolt hole there through. The upright post bolt hole runs from the upper surface of the headrest end of the base member to the lower surface of the headrest end of the base member. The upright post bolt hole has a stepped configuration, and an associated upright post bolt.

Next, there is an upright post. The upright post is fabricated of a rigid material. The upright post has a solid shaft configuration, with a cross member end and a base member end. The base member end of the upright post has a threaded bolt hole therein. The threaded bolt hole is configured to mate with and receive the upright post bolt, thereby fixing the upright post to the cross member end of the base member. The cross member end of the upright post has a cross member attachment pin, with the cross member attachment pin having a second external diameter.

Next, there is an upright cross member. The upright cross member is fabricated of a rigid material. The upright cross member has a generally rectilinear configuration, with an upper surface and a lower surface with a thickness there between. The upright cross member has a plurality of holes therethrough. The cross member has a plurality of camera mounting holes therethrough.

Lastly, there are a plurality of camera mounts. Each camera mount has a fixed mounting pin, a body, and a swivel. Each swivel has a flange, with a projecting thread, for attaching a camera to the swivel. The body of each of the camera mounts has a position adjustment locking screw threadedly attached thereto. The position adjustment locking screw thereby fixes the position of the swivel within the body of the camera mount. The position of the swivel is movable with the loosening of the position adjustment locking screw.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved headrest camera mounting system which has all of the advantages of the prior art camera mounts and none of the disadvantages.

It is another object of the present invention to provide a new and improved headrest camera mounting system which may be easily and efficiently manufactured and marketed.

It is further object of the present invention to provide a new and improved headrest camera mounting system which is of durable and reliable constructions.

An even further object of the present invention is to provide a new and improved headrest camera mounting system which is susceptible of a low cost of manufacture with regard to both materials and labor, and which accordingly is then susceptible of low prices of sale to the consuming public, thereby making such headrest camera mounting system economically available to the buying public.

Even still another object of the present invention is to provide a headrest camera mounting system which is variable, and allows for the mounting of one, or more, cameras in a vehicle.

Lastly, it is an object of the present invention to provide a new and improved headrest camera mounting system, comprising, in combination a base member having a headrest end and a camera mount end and an intermediate portion there between. The base member is coupled to an upright post. The base member has a slide, which allows for adjustment so as to be able to be used with various common vehicle headrest configurations. There is an upright cross member having a generally rectilinear configuration being coupled to the upright post. Lastly there is a least one camera mount, with the camera mount being coupled to the upright cross member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a view taken along line 4-4 of FIG. 1.
FIG. 5 is a view taken along line 5-5 of FIG. 4.

The same reference numerals refer to the same parts throughout the various Figures.

DESCRIPTION OF THE PREFERRED EMBODIMENT

Figure 1:
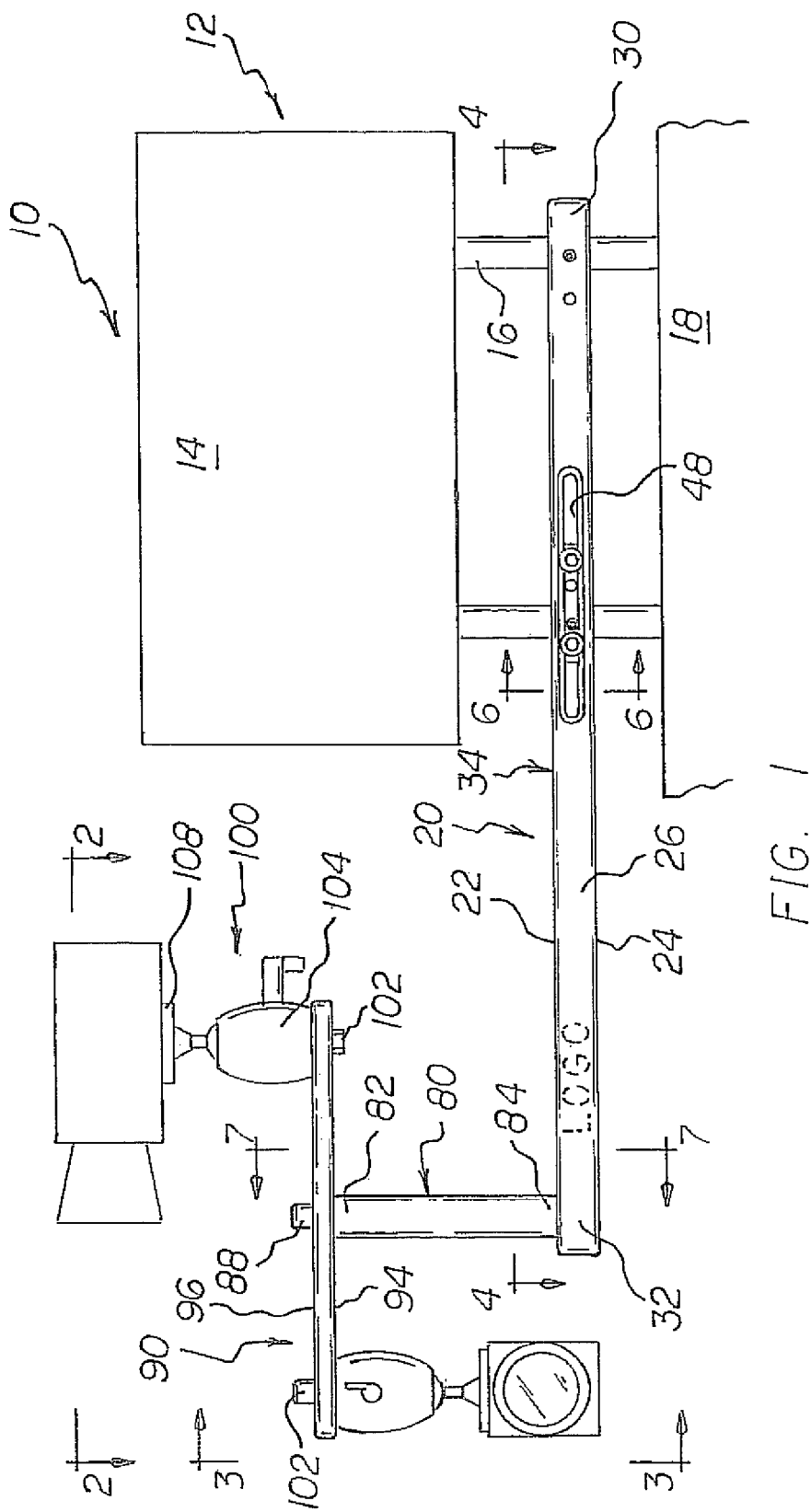
FIG. 1 is side elevational view of the camera mounting system installed on a vehicle seat headrest. Note that there are two cameras, each directed in different directions.
Figure 2:
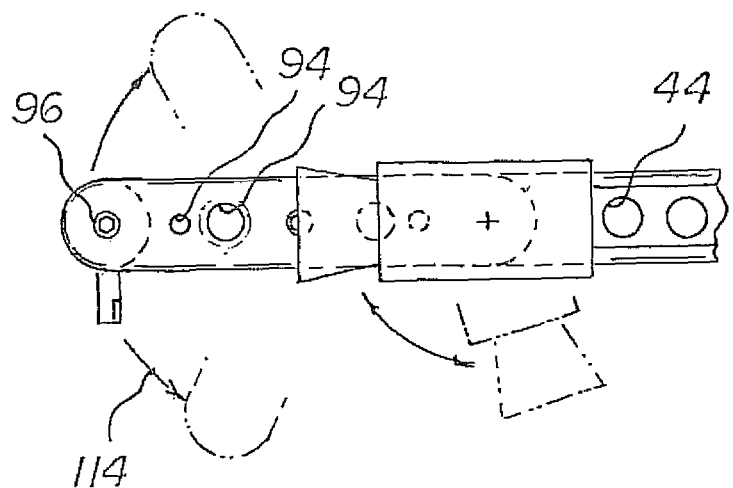
FIG. 2 is a view taken along line 2-2 of FIG. 1.
Figure 3:
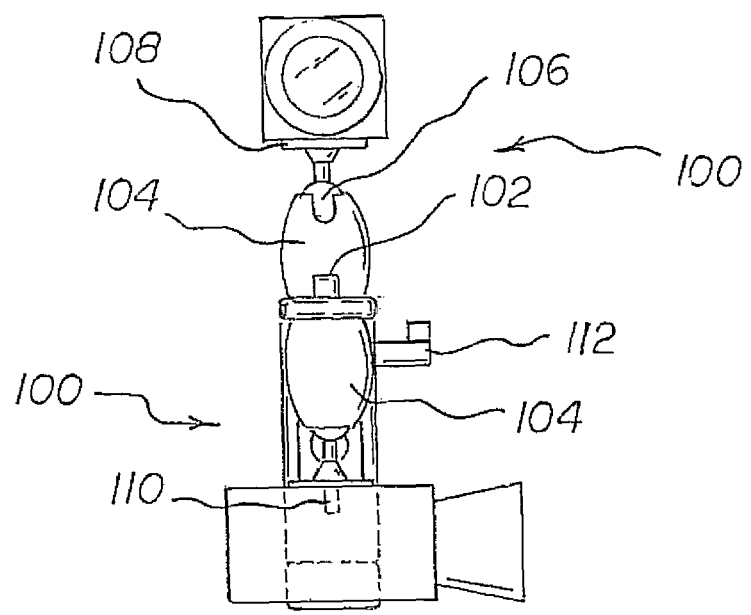
FIG. 3 is a view taken along line 3-3 of FIG. 1.
Figure 6:
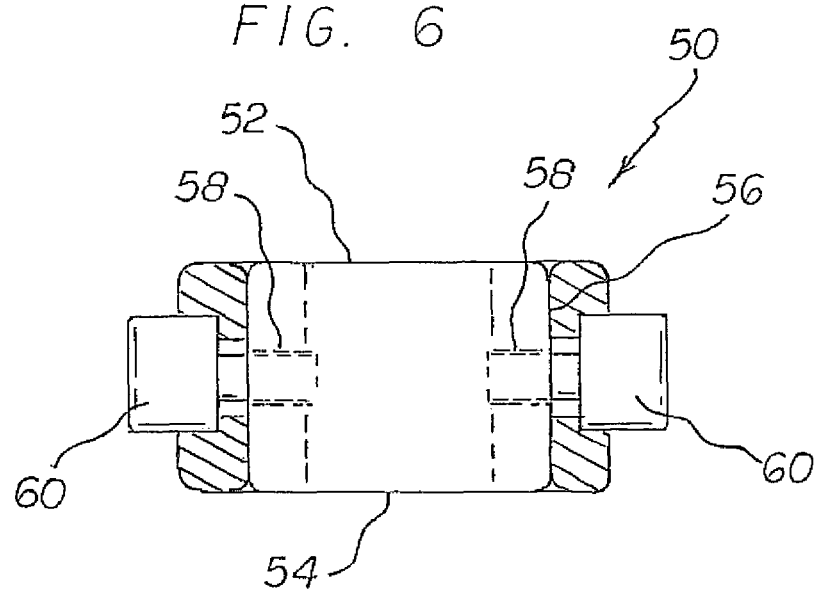
FIG. 6 is a view taken along line 6-6 of FIG. 1.
Figure 7:
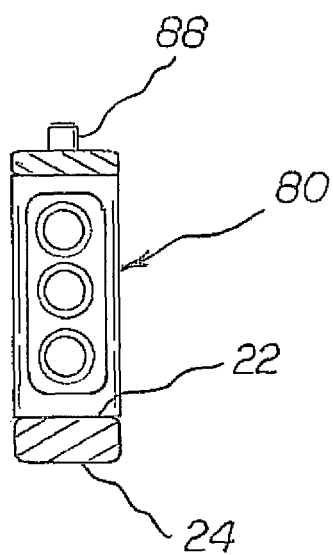
FIG. 7 is a view taken along line 7-7 of FIG. 1.

With reference now to the drawings, and in particular to FIG. 1 thereof, the preferred embodiment of the new and improved headrest camera mounting system embodying the principles and concepts of the present invention and generally designated by the reference numeral 10 will be described.

The present invention, the headrest camera mounting system 10 is comprised of a plurality of components. Such components in their broadest context include a base member, an upright post, an upright cross member and at least one camera mount. Such components are individually configured and correlated with respect to each other so as to attain the desired objective.

A headrest camera mounting system 10, comprising several components, in combination is herein described.

First, there is an existing headrest 12. The headrest has a padded head portion 14 and at least one head rest support 16. The headrest support has a solid tubular configuration. The headrest support couples the headrest to an existing seat 18. The headrest is one commonly found in automobiles, and well known in the art. Hence, no further discussion will be provided as to the configuration or usage of the headrest.

Next, there is a base member 20. The base member is fabricated of a rigid material, such as metal or plastic. The base member has a generally rectilinear configuration, with an upper surface 22, a lower surface 24, and a side peripheral surface 26 there between.

The base member has a headrest end 30 and a camera mount end 32, with an intermediate portion 34 there between. The headrest end has a fixed headrest support hole 36 there through. The fixed headrest support hole runs through the base member, from the upper surface of the base member headrest end to the lower surface of the base member headrest end. The fixed headrest support hole has a first internal diameter. The first internal diameter is sized to be larger than the headrest support, and to receive the headrest support into the fixed headrest support hole. The side peripheral surface of the headrest end of the base member has a first threaded headrest support hole locking screw hole 38. There is a first headrest support hole locking screw 40 associated with the support hole locking screw hole, and the screw is threadedly received therein.

The base member intermediate portion is continuous with the base member headrest end. The intermediate portion has a plurality of holes 44 there through. The plurality of holes has the first internal diameter. The intermediate portion holes run from the upper surface of the intermediate portion to the lower surface of the intermediate portion. The intermediate portion had an upper to lower adjustment slot 46 there through. The intermediate portion adjustment slot has a pair of peripheral side locking slots 48. The side locking slots are located perpendicular to the adjustment slot and communicating with the adjustment slot of the intermediate portion of the base member.

Next, there is an intermediate portion slide 50. The intermediate portion slide is fabricated of a rigid material. The intermediate portion slide has a generally rectilinear configuration. The intermediate portion slide has an upper surface 52, a lower surface 54, and a side edge 56 there between. The side edge of the intermediate portion slide has a plurality of threaded slide locking holes 58 therein, with each threaded slide locking hole having an associated slide locking bolt 60. The intermediate portion slide has a headrest support hole 62 therethrough. The headrest support hole has the first internal diameter. The headrest support hole of the intermediate portion slide runs through the slide, from the upper surface of the slide to the lower surface of the slide. The side edge of the slide has a second threaded locking hole 64 therein. The second threaded locking hole runs from the side edge of the slide into the headrest support hole of the slide. The second threaded locking hole has a second locking screw 66 associated therewith. The slide locking bolts are configured to pass through the intermediate portion peripheral side locking slots and to be threadedly received by the threaded slide locking holes of the slide, thereby allowing for the fixation of the slide within the upper to lower adjustment slot of the intermediate portion of the base member.

The camera mount end of the base member has an upright post bolt hole 70 there through. The upright post bolt hole runs from the upper surface of the headrest end of the base member to the lower surface of the headrest end of the base member. The upright post bolt hole has a stepped configuration 72, and an associated upright post bolt 74.

Next, there is an upright post 80. The upright post is fabricated of a rigid material. The upright post has a solid shaft configuration, with a cross member end 82 and a base member end 84. The base member end of the upright post has a threaded bolt hole 86 therein. The threaded bolt hole is configured to mate with and receive the upright post bolt, thereby fixing the upright post to the cross member end of the base member. The cross member end of the upright post has a cross member attachment pin 88, with the cross member attachment pin having a second external diameter.

Next, there is an upright cross member 90. The upright cross member is fabricated of a rigid material. The upright cross member has a generally rectilinear configuration, with an upper surface 92 and a lower surface with a thickness there between. The upright cross member has a plurality of holes 94 therethrough. The cross member has a plurality of camera mounting holes 96 therethrough.

Lastly, there are a plurality of camera mounts 100. Each camera mount has a fixed mounting pin 102, a body 104, and a swivel 106. Each swivel has a flange 108, with a projecting thread 110, for attaching a camera to the swivel. The body of each of the camera mounts has a position adjustment locking screw 112 threadedly attached thereto. The position adjustment locking screw thereby fixes the position of the swivel within the body of the camera mount. The position of the swivel is movable with the loosening of the position adjustment locking screw to allow the camera to swing through any one of a number of planes 114, and to be locked in a single location and orientation.

In use, the variations in the size of the holes through the base member and the slide allow for using the system on vehicles which have either a large headrest support or a small headrest support. The slide accommodates a wide variations in the width between headrest supports. The upright post may be mounted on the upper surface or the lower surface of the base member. In addition there may be more than two cameras mounted to the upright post, enabling one camera to be directed forward, through the windshield, one directed toward the controls, and one, if desirable, to be directed toward the plane parallel with the vehicle, as would be the case in recording a rival's vehicle during a race, such as a drag race. This would allow the driver and racing team to go back in time and study the three views on a frame by frame basis. The cameras could record directly to a recording device within the vehicle, or the cameras may be "wireless" and send a signal to a remote receiver, such as the location of the racing pit crew.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A headrest camera mounting system, comprising, in combination:
    a base member having a generally rectilinear configuration with an upper surface and a lower surface and a side peripheral surface there between, the base member having a headrest end and a camera mount end and an intermediate portion there between;
    an upright post having a solid shaft configuration with a cross member end and a base member end, the upright post being coupled to the base member;
    an upright cross member having a generally rectilinear configuration with an upper surface and a lower surface with a thickness there between, the upright cross member being coupled to the upright post;
a least one camera mount, with the camera mount being coupled to the upright cross member;
the headrest end of the base member having a fixed headrest support hole there through;
the base member intermediate portion being continuous with the base member headrest end;
an intermediate portion slide having a generally rectilinear configuration;
the camera mount end of the base member having an upright post bolt hole there through running from the upper surface of the camera mount end of the base member to the lower surface of the camera mount end of the base member.

2. The headrest camera mounting system as described in claim 1, with the system further comprising:
the fixed headrest support hole running from the upper surface of the base member headrest end to the lower surface of the base member headrest end;
the intermediate portion of the base member having a plurality of holes there through;
the intermediate portion slide having an upper surface and a lower surface and a side edge there between; and
the camera mount having a fixed mounting pin and a body and a swivel.

3. The headrest camera mounting system as described in claim 2, with the system further comprising:
the intermediate portion of the base member having an upper to lower adjustment slot there through;
the upright post bolt hole of the camera mount end of the base member having a stepped configuration with an associated upright post bolt; and
the base member end of the upright post having a threaded bolt hole therein, the threaded bolt hole being configured to mate with and receive the upright post bolt, thereby fixing the upright post to the cross member end of the base member.

4. The headrest camera mounting system as described in claim 3, with the system further comprising:
the fixed headrest support hole having a first internal diameter;
the plurality of holes in the intermediate portion of the base member each having the first internal diameter, with the holes running from running from the upper surface of the intermediate portion to the lower surface of the intermediate portion;
the upright cross member having a plurality of camera mounting holes therethrough; and
a plurality of camera mounts, with each of the camera mount swivels each having a flange with a projecting thread for attaching a camera to the swivel.

5. The headrest camera mounting system as described in claim 4, with the system further comprising:
the side peripheral surface of the headrest end of the base member having a first threaded headrest support hole locking screw hole, with a first associated headrest support hole locking screw being received therein;
the base member intermediate portion adjustment slot having a pair of peripheral side locking slots, the side locking slots being located perpendicular to the adjustment slot and communicating with the adjustment slot;
the cross member end of the upright post having a cross member attachment pin with the cross member attachment pin having a second external diameter; and
the body of each of the camera mounts having a position adjustment locking screw threadedly attached thereto, the position adjustment locking screw thereby fixing the position of the swivel within the body of the camera mount, the position of the swivel being movable with the loosening of the position adjustment locking screw.

6. The headrest camera mounting system as described in claim 5, with the system further comprising the upright cross member having a plurality of holes therethrough.

7. The headrest camera mounting system as described in claim 6, with the system further comprising:
an existing headrest, the headrest having a padded head portion and at least one head rest support, the headrest support having a solid tubular configuration, the headrest support coupling the headrest to an existing seat;
the base member being fabricated of a rigid material;
the intermediate portion slide being fabricated of a rigid material;
the upright post being fabricated of a rigid material; and
the upright cross member being fabricated of a rigid material.

8. A headrest camera mounting system, comprising, in combination:
a base member having a generally rectilinear configuration with an upper surface and a lower surface and a side peripheral surface there between, the base member having a plurality of holes there through;
an upright post being coupled to the base member;
an upright cross member being coupled to the upright post;
a least one camera mount, with the camera mount being coupled to the upright cross member;
the base member having at least one slot therethrough with the slot having a movable slide; and
the camera mount being adjustable so as to allow variation in the direction of a camera;
the base member slide having a plurality of holes therethrough; and
the upright cross member camera mount being adjustable.

* * * * *